Feb. 16, 1926.

E. C. PEARSON 1,573,270

PLANT SETTER

Filed August 4, 1924

Inventor
E. C. Pearson,

By Richard B. Owen,

Attorney

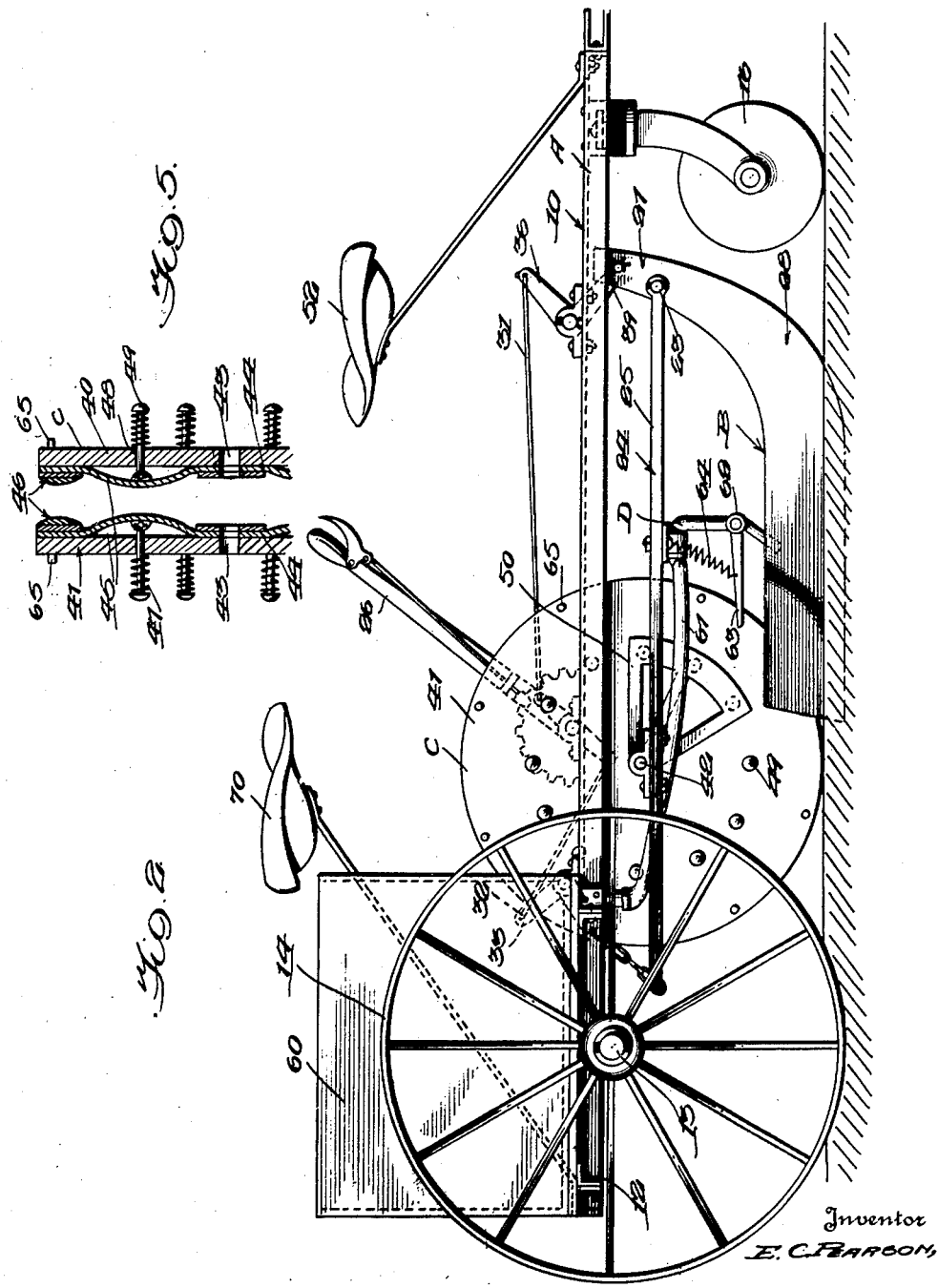

Feb. 16, 1926.
E. C. PEARSON
1,573,270
PLANT SETTER
Filed August 4, 1924    3 Sheets-Sheet 3
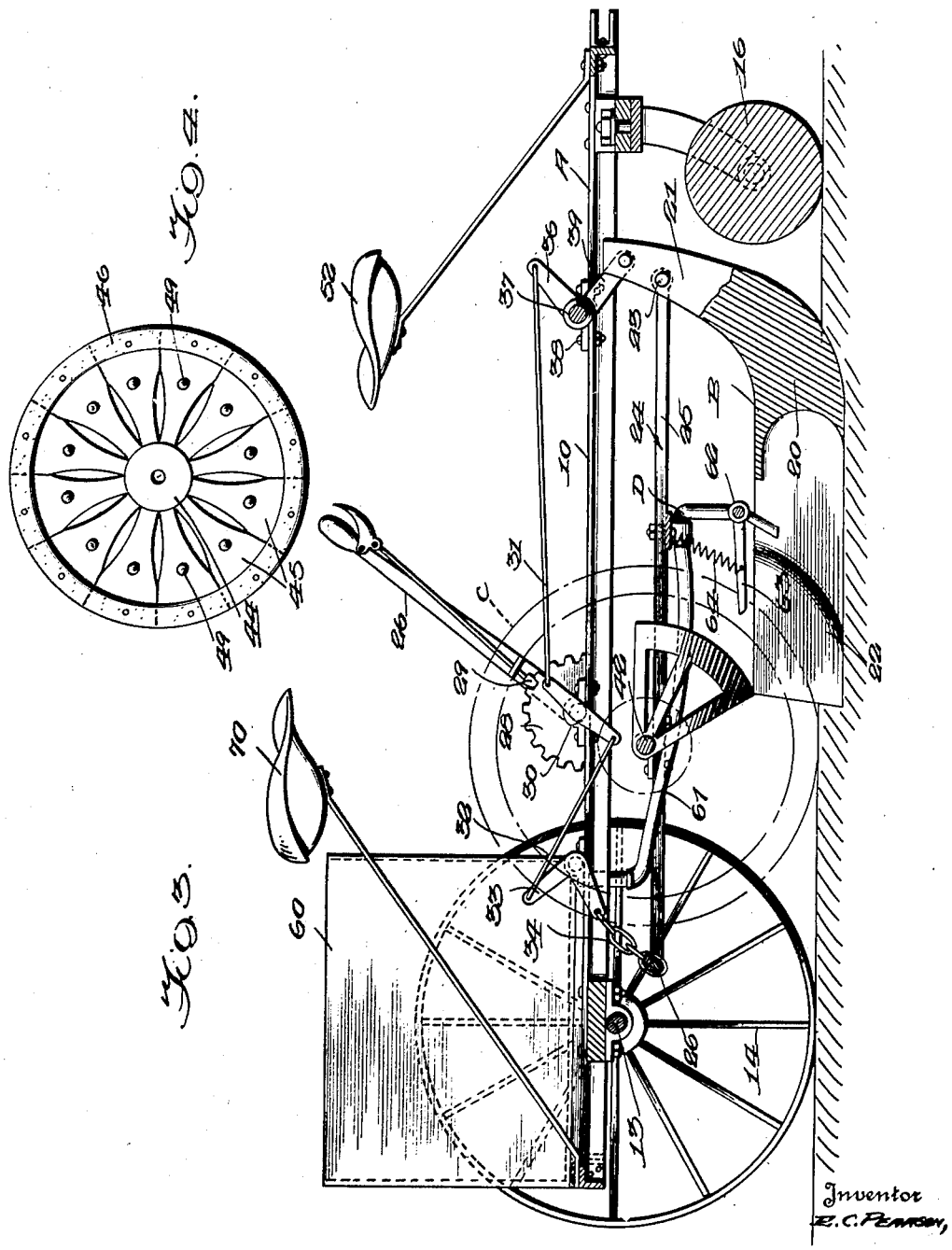
Inventor
E. C. Pearson,
By Richard B. Owen,
Attorney Patented Feb. 16, 1926.

1,573,270

UNITED STATES PATENT OFFICE.

ELIHU C. PEARSON, OF STILLWATER, OKLAHOMA.

PLANT SETTER.

Application filed August 4, 1924. Serial No. 730,080.

*To all whom it may concern:*

Be it known that I, ELIHU C. PEARSON, a citizen of the United States, residing at Stillwater, in the county of Payne and State of Oklahoma, have invented certain new and useful Improvements in Plant Setters, of which the following is a specification.

This invention appertains to a novel machine for depositing young plants, such as tomato, cabbage, tobacco plants, and the like, in the ground, and the primary object of the invention is to provide an improved machine embodying a shoe for opening up the furrow for receiving the plants, novel means for receiving and depositing the plants one at a time in the ground, and novel means for watering the ground around the plants after the same have been set.

A further object of the invention is to provide novel means for raising the furrow opening shoe and the plant setting device into an inoperative position when the machine is being moved from one place to another.

A further object of the invention is to provide novel means for constructing the device for receiving and depositing the plants in the ground, said device embodying a pair of plant receiving disks having flexible rims and novel means for forcing the rims in gripping contact with the plants and out of contact with the plants at the desired time for permitting the same to be deposited in correct position in the ground.

A still further object of the invention is to provide an improved plant setter of the above character, which will be durable and efficient in use, one that will be simple and easy to manufacture, and one which can be placed upon the market at a small cost.

With these and other objects in view, the invention consists in the novel construction, arrangement and formation of parts, as will be hereinafter more specifically described, claimed, and illustrated in the accompanying drawings, in which drawings:

Figure 2 is a side elevation of the same,

Figure 3 is a longitudinal vertical section through the machine,

Figure 4 is an elevation of one of the plant depositing disks looking from the inside thereof, and Figure 5 is a detailed diametric section through the plant depositing device illustrating the novel flexible rims for engaging the plants to be deposited.

Figure 1:
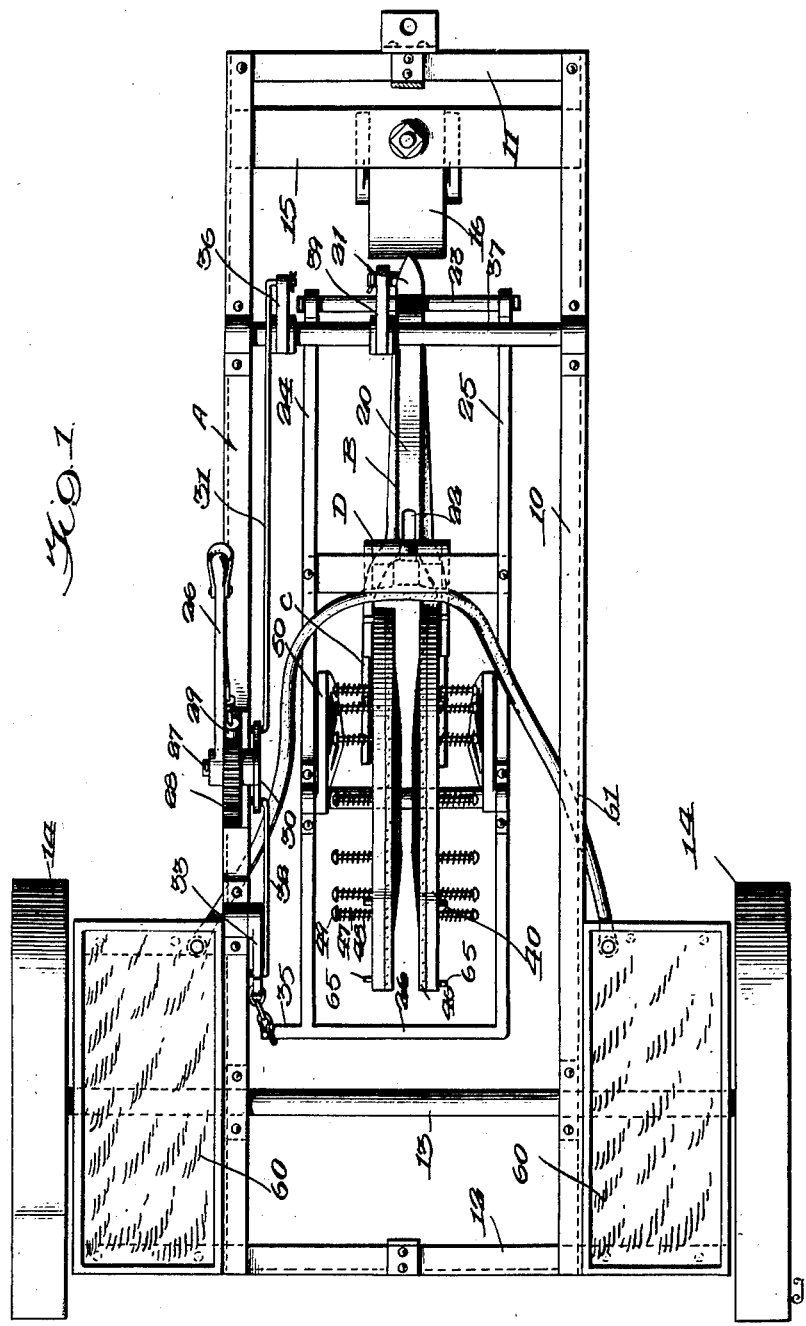
Figure 1 is a top plan view of the improved machine.

Referring to the drawings in detail, wherein similar reference characters designate corresponding parts throughout the several views, the letter A generally indicates the frame of the machine; B the furrow opening device; C the plant receiving and depositing device; and D the plant watering mechanism.

The frame A of the machine can be constructed in any desired way and of any desired material, but as shown includes the spaced longitudinally extending side beams 10 formed of angle iron and front and rear connecting cross beams 11 and 12. The front cross beam 11 can have secured thereto in any desired way any preferred type of draft appliance to permit the machine to be drawn across a field. The rear end of the frame A supports in any desired manner, the transversely extending main axle 13 on which is mounted the rear ground wheels 14. Extending transversely across the frame at the front thereof is a brace bar 15 which swivelly carries the front ground wheel 16. This ground wheel 16 is of a relatively small diameter and includes a relatively broad rim for breaking up clods in the path of the furrow opening device B.

The furrow opening device B comprises a shoe 20 preferably formed of heavy metal with its forward end upturned and sharpened as at 21 to facilitate the opening of the furrow for the reception of the plants to be set. It is also preferred to have the outer surface of the shoe polished similar to the outer surface of an ordinary plow. The body portion of the shoe 20 adjacent to the rear end thereof is bifurcated as at 22 and flared upwardly as clearly shown in Figure 1 for a purpose, which will be hereinafter more fully described. The upturned end 21 of the shoe 20 rockably receives the front cross bar 23 of the supplemental supporting frame 24, which is disposed below the main frame A. This supplemental supporting frame 24 embodies longitudinally extending side bars 25 connected at their forward ends by the bar 23 and at their rear ends by the bar 26. This supplemental supporting frame 24 is utilized for supporting the plant setting device C and the watering device D as will now be described. It is to be noted however, that the frame 24 can be raised or lowered for bringing the shoe 20 and the plant setting device C into and out of operative position relative to the ground, and this means embodies a hand lever 26 secured to a shaft 27 at its lower end which is carried by the sector rack 28. The lever is held in its adjusted position by means of a suitable plug or bar 29 which is adapted to engage in the said rack. The shaft 27 has secured to its other end a double-armed lever 30 and the opposite ends of this lever has secured thereto links 31 and 32 respectively. The link 32 is connected with a bell crank 33 which is pivoted at its angle on one of the side beams 10 of the main frame A. This bell crank has secured to its lower arm a lifting chain 34, the lower link of which is connected with a lug 35 formed on the rear bar 26 of the supplemental frame 24. The forward end of the link 31 is connected with the upper end of a crank arm 36 which is secured in any desired way to a transversely extending shaft 37 rockably mounted in bearings 38 carried by the side bars 10 of the main frame A. This shaft 37 has also keyed or otherwise secured thereto a crank arm 39 the forward end of which is secured to the extreme upper end of the curved extension 21 of the shoe 20. It is obvious that by moving the lever 26 that the shoe and frame 24 and parts carried thereby can be raised and lowered.

The plant setting device C comprises a pair of facing disks 40 and 41 which are rotatably mounted at their axial centers on a suitable transversely extending shaft 42 rigidly secured in any desired way to the side bars 25 of the supplemental frame 24.

Each disk 40 and 41 embodies a solid circular plate 43 rotatably mounted on the shaft 42. The inner faces of these solid plates 43 have connected thereto by means of hub rings 44 radially extending sector shaped bowed resilient arms 45 which are all connected together at their outer ends by padded rims 46 which are utilized for gripping the plants in such a manner that injury thereto will be precluded. The sector shaped arms 45 and the rims 46 are normally held in engagement with the plates 43 by means of expansion springs 47 which are coiled about rods 48. These rods 48 extend through suitable openings in the circular plates 43 and the inner ends of these rods are pivotally connected to the said sector shaped arms 45. The outer ends of the rods or bolts 48 are provided with heads 49 and the springs 47 engage the heads and the outer faces of the plates 43. Thus it is obvious that the resilient arms will be normally urged toward the said plates. By this construction so far explained, it can be seen that as the machine is driven across a field that the peripheries of the solid plates 43 engage the ground and rotate in a clockwise direction. The plant setting device B is so constructed and arranged that the rims 46 are adapted to be moved toward each other to a plant gripping position adjacent to the upper end of the device so that an operator can feed the plants between the rims, the rims being adapted to carry the plants down into the ground at which time the rims will be separated and the plants released. The means for bringing the padded rims toward and away from each other embodies a pair of cam plates 50 which are rigidly secured to the shaft 42 and these cam plates 50 extend forwardly toward the front of the machine and by referring to Fig. 1 of the drawings it can be seen that these cam plates have the inner portions thereof gradually increased in thickness toward their lower ends so that the said cam plates appear to converge toward each other. By referring to Fig. 1 it can be seen that a cam plate is arranged on each side of the disk and that the curved heads of the bolts 48 are adapted to engage the inner surface of the cam plates during the rotation of the plant setting device.

Now as the plant setting device B rotates it can be seen that the bolt heads 49 will ride in engagement with the upper surface of the cams and that the heads riding on said surface will gradually force in the flexible sector plates 45 bringing the rims 46 into gripping contact with one another. At this time the operator feeds the plants one at a time between the rims and the operator is adapted to sit upon a suitable seat 52 arranged on the frame. Now the plant setting device continuing its rotation will bring the plants downward toward the ground and as the heads 49 of the rods or bolts ride off of the cam surface the springs 47 will return the flexible plates and that portion of the padded rims carried thereby back to their normal positions releasing the plants and thus depositing the same in the ground.

The plant watering device D embodies liquid receiving tanks 60 carried by the rear end of the frame A and these tanks are connected by means of suitable lead pipes 61 to a spigot or valve 62. This spigot or valve 62 is provided with a valve handle 63 which is engaged by a contractile coil spring 64 which normally holds the valve in a closed position. The valve or spigot is arranged in the bifurcated portion 22 of the shoe 20 and is adapted to be opened so as to water the plant and the ground around the plant when the same is set into the ground. In order to bring about the automatic operation of the valve the outer faces of the solid plates 43 of the plant setting device C are provided with outwardly extending pins 65 which are disposed in the path of the valve lever 63. It is thus obvious that as the disk rotates that the pins 65 will engage the valve lever 63 thus causing the opening thereof each time a plant is deposited into the ground.

A driver's seat 70 can be arranged on the frame for permitting the driver to readily control the draft animals.

From the foregoing description, it can be seen that I have provided an exceptionally simple and durable plant setting device which will permit of a number of plants to be set in the ground in an expeditious and easy manner.

Changes in details may be made without departing from the spirit or the scope of this invention, but:

What I claim as new is:

1. A plant setting device comprising a wheeled frame, a plant depositing wheel carried by the frame having a pair of solid plates, resilient sector arms secured to the inner faces of the plates, padded rims secured to the outer ends of the arms, spring means for normally holding the rims in engagement with their respective plates, and means for urging the flexible rims toward one another against the tension of said springs at predetermined times.

2. A plant setting device comprising a wheeled frame, a plant depositing wheel carried by the frame embodying a pair of circular plates for engaging the ground, sector shaped resilient arms secured to the inner surface of the plates and extending radially from the axial centers thereof, padded rims secured to the outer ends of the flexible sector shaped arms, sliding rods carried by the circular plates and attached to the arms, heads formed on the outer ends of the rods, expansion springs coiled about the rods and engaging the circular plates and the heads on the rods for normally urging the arms and rims in engagement with their respective circular plates, and cam members disposed in the path of the heads on the rods for urging the arms toward one another at a predetermined point for permitting the gripping and placing of plants in the ground.

In testimony whereof I affix my signature.

ELIHU C. PEARSON.